UNITED STATES PATENT OFFICE.

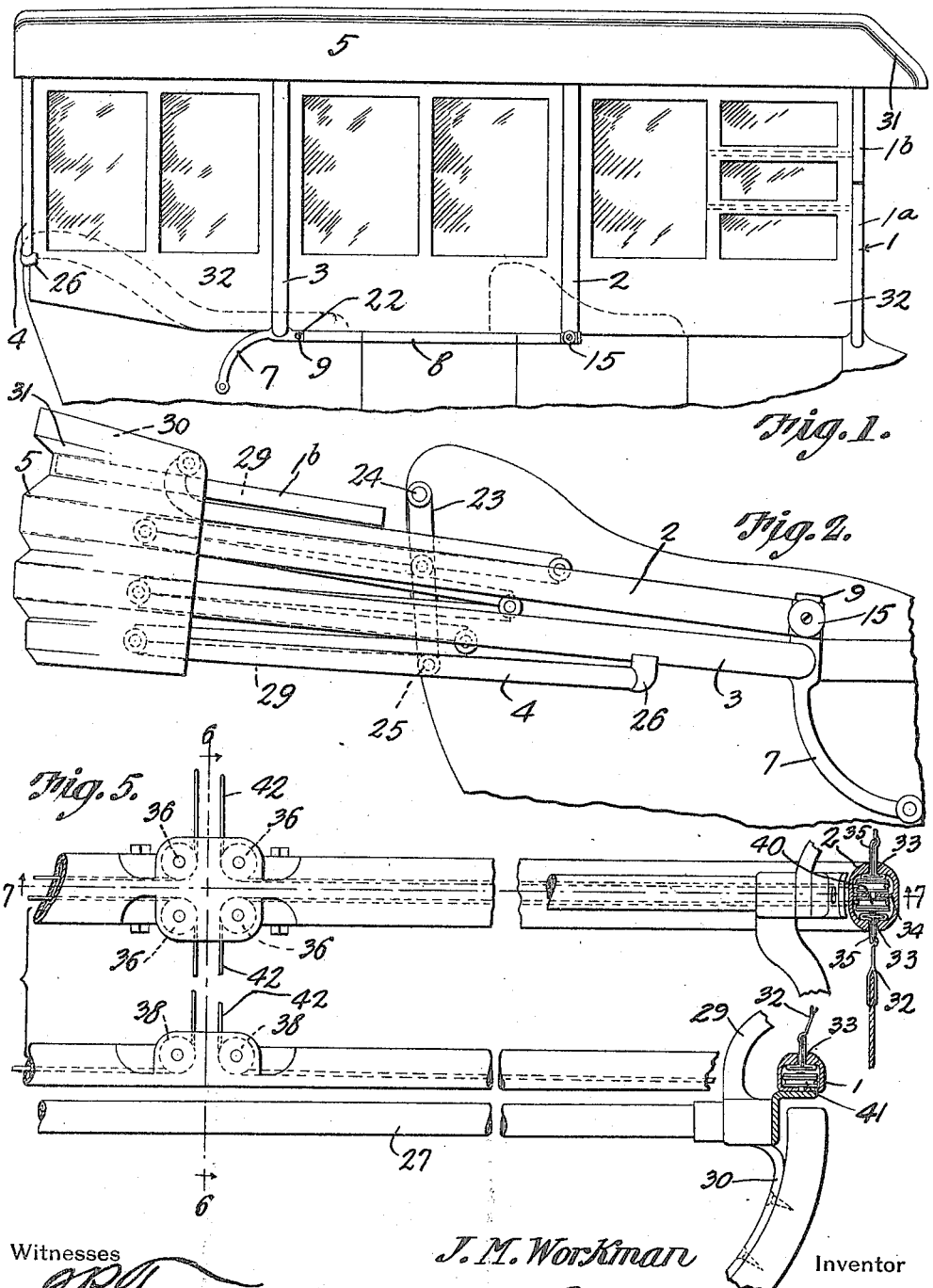

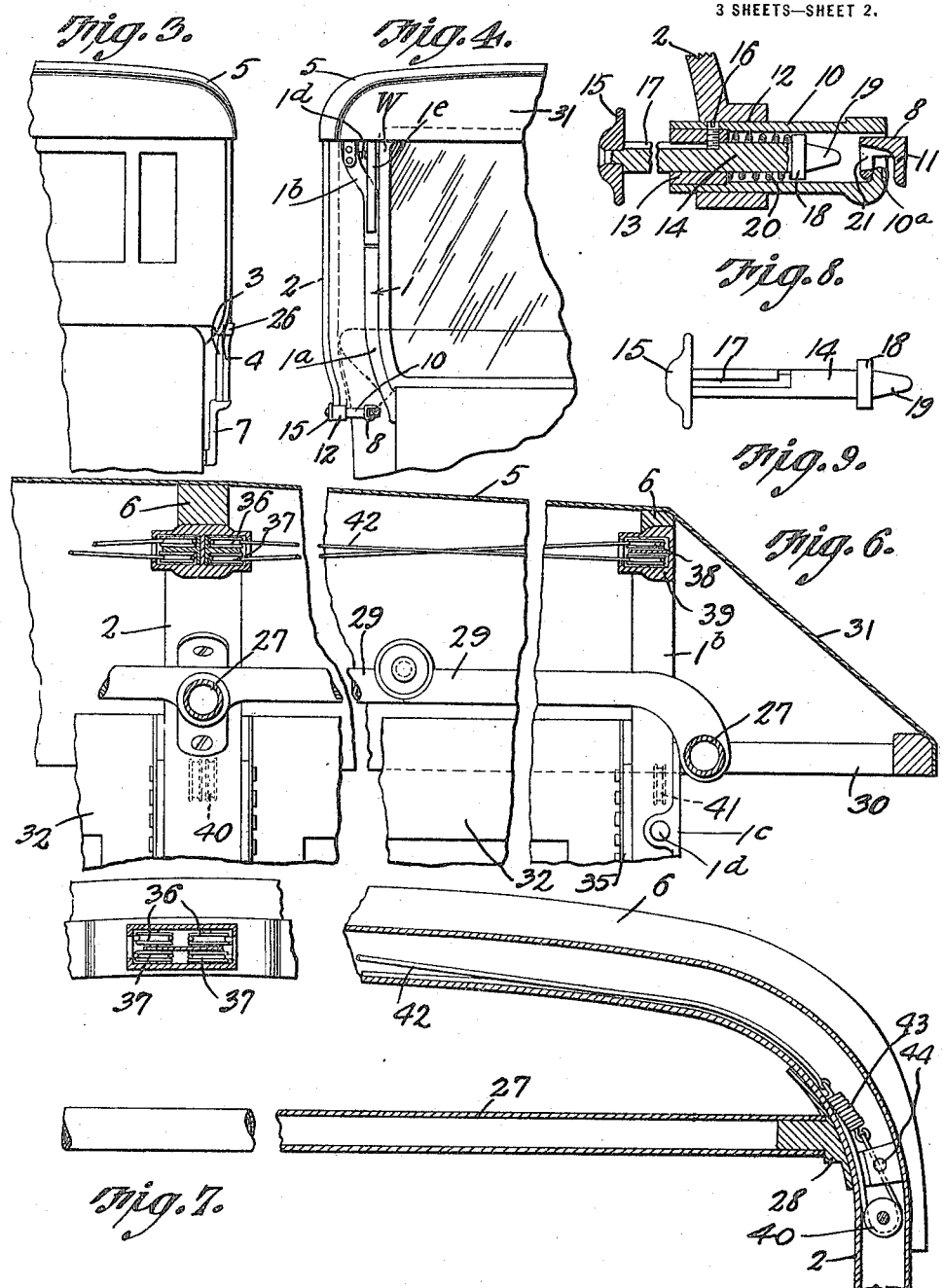

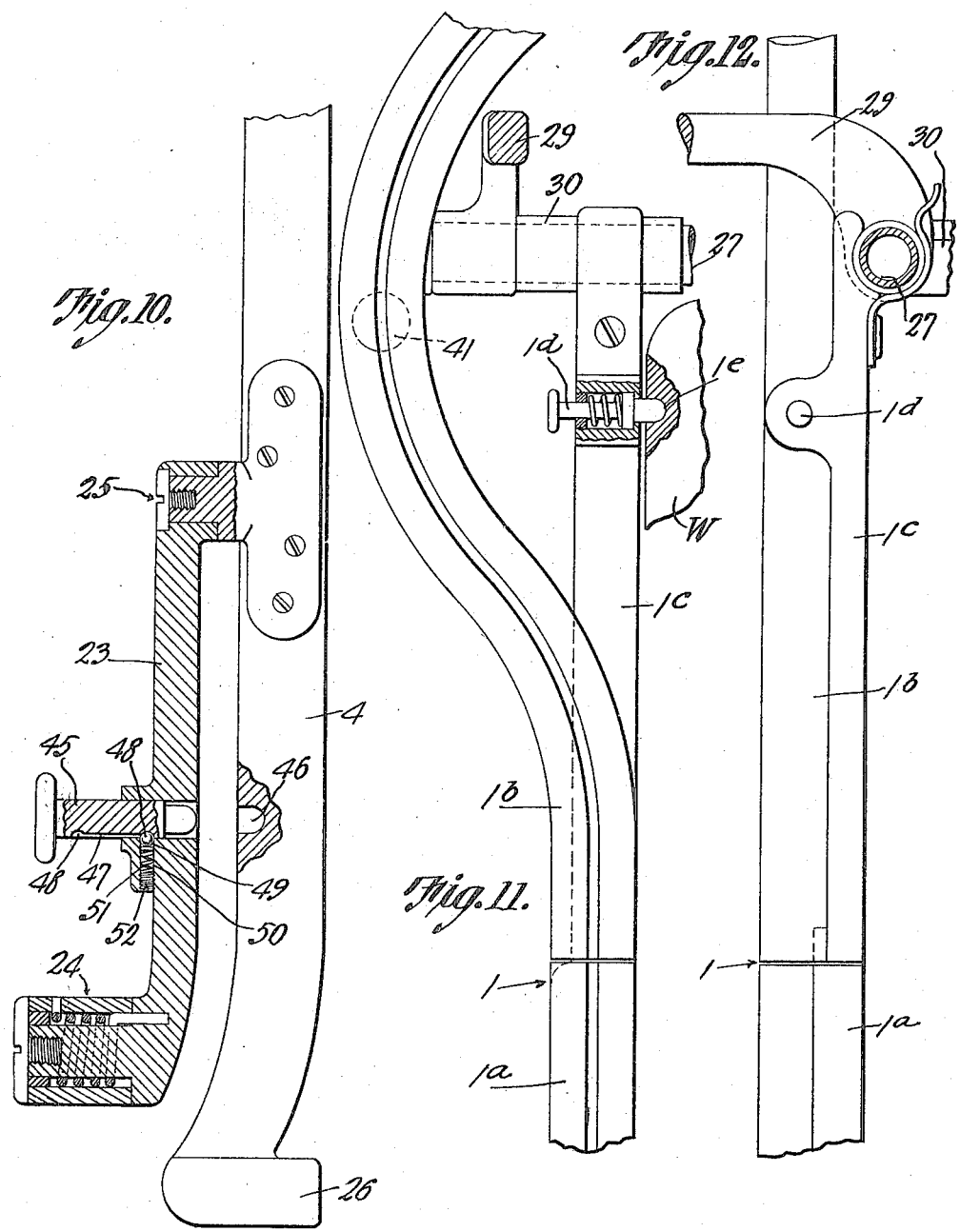

JAMES MINOR WORKMAN, OF GREENVILLE, SOUTH CAROLINA.

AUTOMOBILE-TOP.

1,193,107.

Specification of Letters Patent.

Patented Aug. 1, 1916.

Application filed May 12, 1915. Serial No. 27,642.

*To all whom it may concern:*

Be it known that I, JAMES M. WORKMAN, a citizen of the United States, residing at Greenville, in the county of Greenville and State of South Carolina, have invented a new and useful Automobile-Top, of which the following is a specification.

The present invention appertains to automobile or vehicle tops, and is particularly an improvement over the automobile top disclosed in my Patent No. 1,123,458 issued January 5, 1915.

One of the objects of the present invention is the provision of novel means for controlling the curtains which are slidably carried by the bows, whereby the opposite edge portions of the curtains are caused to move upwardly and downwardly simultaneously, to avoid the buckling or distortion of the curtains, when they are raised and lowered.

Another object of the invention is the provision of a peak of novel construction and operation, whereby it will be automatically unfolded and folded when the top is erected and taken down, respectively.

A still further object of the invention is the provision of novel and improved means for mounting and holding the bows of the top in erected or folded positions.

The invention also has for an object, to provide novel means for assembling the first or front bow with the wind shield.

Another object of the invention is the provision of novel means for bolting or locking the rear bow in erect position, and for holding or locking the folded or collapsed bows in place when the top is lowered.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a side elevation of the top unfolded or erected. Fig. 2 is an enlarged side elevation of the top in folded or collapsed condition. Fig. 3 is a fragmental rear end view of the erected top. Fig. 4 is a fragmental front end view of the top in erected position. Fig. 5 is an enlarged fragmental plan view of the framework of the top, illustrating the controlling means for one of the curtains. Figs. 6 and 7 are sectional views taken on the lines 6—6 and 7—7, respectively, of Fig. 5, portions being broken away. Fig. 8 is an enlarged sectional view of the guiding and locking member of the sliding bow. Fig. 9 is a plan view of the latch of the device illustrated in Fig. 8. Fig. 10 is an enlarged fragmental detail illustrating the latch device carried by one of the links which support the rear bow. Fig. 11 is an enlarged fragmental view of the front bow, illustrating one latch device carried thereby for engaging the wind shield. Fig. 12 is an enlarged detail of the parts illustrated in Fig. 11 looking in a direction at right angles to the line of view in Fig. 11.

In carrying out the invention, the framework of the top embodies a front or first bow 1, a second or sliding bow 2, a third or pivoted bow 3, and a rear or fourth bow 4. These bows are preferably, although not necessarily, drawn from suitable metal and have the fabric or flexible cover or canopy 5 secured upon their crest portions, wooden or similar strips 6 being preferably secured upon the crest or crown portions of the bows for the attachment of the cover or canopy 5 thereto.

The front bow 1 comprises side sections 1ª which are secured in any suitable manner to the side members of the frame of the wind shield W carried above the dash of the vehicle body, and a crown portion or section 1ᵇ whose ends are adapted to aline with the upper ends of the sections 1ª when the top is erected, and whereby the crown portion 1ᵇ will surround the upper portion of the wind shield to be carried thereby. The limbs or ends of the crown portion 1ᵇ have upstanding members 1ᶜ through which spring pressed latch bolts 1ᵈ are slidable, the inner ends of the latch bolt 1ᵈ being engageable in sockets 1ᵉ formed in the frame of the wind shield W adjacent the upper edge of the wind shield. Thus, when the top is erected the crown 1ᵇ in being moved over the wind shield may be secured thereto by means of the latch bolts, and the sections of the front bow will be brought into alinement.

The ends of the third or pivoted bow 3 are secured rigidly to a pair of top irons 7 that are pivoted to the opposite sides of the tonneau of the vehicle body, whereby the bow 3 may be swung rearwardly in back of the tonneau, as illustrated in Fig. 2.

The second or sliding bow 2 is guided for movement to and from the pivoted bow 3 by means of guide rails 8 secured to the opposite sides of the vehicle body and its doors. The rails 8 are constructed in sections carried by the body and doors, whereby the doors may be swung open as usual, and when the doors are closed, the rail sections will aline to provide a track for guiding the bow 2 forwardly and rearwardly. The rails 8 extend forwardly from the top irons 7 of the pivoted bow 3, and the irons 7 are provided with forwardly projecting extensions 9 coöperating with the rear ends of the rails 8 and forming continuations of the rails carried by the vehicle body. The ends of the sliding bow 2 are provided with means for engaging the rails 8 and extensions 9 of the irons 7, and to this end, a laterally arranged tubular member 10 is engaged to each rail 8, that is, when the top is erected, the inner end of the tubular member 10 is provided with an upturned lip 10ª engaging in the longitudinal upper groove 11 of the respective rail 8. The tubular members 10 are slidable laterally through the terminal bearings 12 of the bow 2, whereby the members 10 may slide laterally through the bearings 12 when the bow 2 is slid back and forth, it being noted that in "stream line" vehicle bodies, the sides diverge rearwardly, which necessitates movable connections between the bow 2 and the rails. The members 10 are arranged to slip onto the extensions 9 of the irons 7, when the bow 2 is moved rearwardly against the bow 3, whereby the bow 2 will swing rearwardly with the bow 3. The members 10 at the opposite sides, are each provided with means for locking the bow 2 to the rails 5 or to the extension 9 of the corresponding iron 7, and to this end, a bushing 13 is secured within the outer end portion of each tubular member 10 and a latch 14 is slidable therethrough. The outer end of the latch 14 is provided with a hand piece 15 in order that the latch 14 may be retracted or pulled outwardly readily. A screw or securing element 16 is engaged through the tubular member 10 and bushing 13 to secure the bushing in place within the tubular member, and projects inwardly from the bushing to engage the latch 14. The latch 14 is provided with a bayonet slot 17 receiving the screw 16, and whereby when the latch 14 is retracted, it may be rotated to engage the screw 16 within the tail of the bayonet slot for holding the latch in retracted position. The latch 14 is provided adjacent its inner end with an annular collar or flange 18 sliding snugly within the tubular member 10, and the inner end of the latch is tapered, as at 19. A coiled wire expansion spring 20 is disposed within the tubular members 10 between the bushing 13 and collar 19 for yieldably moving or projecting the latch inwardly.

The forward ends of the rails 8, which terminate at the normal erected position of the bow 2, are provided with recesses or sockets 21, whereby when the bow 2 is slid to active position, the latches 14 may be released and their inner ends 19 will engage in the recesses 21 for locking the bow 2 in place. The extensions 9 of the top irons 7 are also provided with similar recesses or sockets 22 for receiving the inner ends 19 of the latches 14 when the bow 2 is slid into engagement with the irons 7.

The rear bow 4 is supported by means of a pair of links 23 hinged to the sides of the vehicle body adjacent the back of the tonneau or rear seat, as at 24, and pivoted to the limbs or side portions of the rear bow 4, as at 25. When the top is folded, the links 23 swing downwardly, as illustrated in Fig. 2, to hang downwardly and support the rear bow, and whereby the pivoted bow 3 may swing into the rear bow, whereas the front bow crown portion 1ᵇ and bow 2 are supported upon the bow 3. The manner in which the bows fold together is practically the same as in the structure disclosed in the said patent, *supra*. When the top is erected, the links 23 swing upward to support the rear bow in an upright position. The ends of the rear bow are provided with irons 26 for engaging the bow 3 when the top is folded, and for engaging the links 23 when the top is erected to limit the upward and forward movement of the rear bow.

Each of the bows carries a transverse shaft 27 adjacent its crown or top, the ends of the shaft 27 being journaled in suitable bearings 28 secured to the inner sides of the limbs or side portions of the bows adjacent the crowns of the bows. Folding braces, each comprising a pair of links 29, connect the end portions of the respective shafts 27, the braces breaking or folding downwardly when the bows are moved together, and moving upwardly to straight line positions when the bows are moved apart to their erected positions. The links 29 are secured to certain of the shafts 27, and are engaged loosely to the others, whereby the opposite limbs or side portions of the bows are constrained to move forwardly and rearwardly in unison, to avoid a binding of the parts when the top is erected and folded.

The shaft 27 of the front bow 1 is carried by the crown portion 1ᵇ of the said bow. The folding braces between the front and sliding bows are attached rigidly to the shafts 27 of the bows 1 and 2, whereby the said shafts are oscillated when the top is erected and folded, and the bow 30 of the peak is terminally secured to the shaft 27 of the front bow so that the peak bow 30 will be swung to horizontal position when the top is erected, and will be swung upwardly against the crown portion of the front bow when the top is folded. The peak extension 31 of the cover or canopy 5 is secured to the bow 30, and will be extended and folded when the bow 30 is swung away from and against the front bow, respectively.

Sliding side curtains 32 are carried by the bows, each pair of bows carrying a pair of curtains, and to this end, the bows are hollow and are provided with longitudinal slots 33 for the sliding engagement of the curtains to the bows. The second and third or intermediate bows 2 and 3 are each provided with a pair of slots 33, since the said bows will accommodate curtains in front and rear thereof, and said bows are also provided with central webs 34 between the front and rear slots 33 to provide front and rear slide ways for the curtains, whereas the front and rear bows each has but a single slide way and slot 33, as will be apparent. Flexible doubled binding strips 35, preferably constructed of metal, are slidable within the slide ways of the bows, and extend out through the slots 33 and have their edge portions clenched to the edges of the curtains 32, whereby the curtins will be carried by the flexible metallic strips 35 which slidably engage the bows.

A controlling device is employed for each curtain, whereby the curtain may be properly raised and lowered, and since these devices are alike in construction, only one of them need be described and illustrated in detail. The controlling device for one of the front curtains between the first and second bows has been selected and illustrated in detail in the drawings, and will be described in detail, which will suffice, it is thought, for an understanding of the controlling means of the various curtains. Thus, a pair of superposed pulley wheels 36 and 37 are pivoted within the intermediate portion of the second bow 2, and a similar pair of wheels 38 and 39 are pivoted within the intermediate portion of the front bow 1, whereas a pulley wheel 40 is pivoted within the respective limb or side portion of the bow 2 opposite the respective slot 33 while a pulley wheel 41 is pivoted within the respective limb or side of the crown portion $1^b$ of the front bow 1. A cord or cable 42 is trained around the said pulley wheels, the same being crossed between the pulley wheels 36—37 and 38—39, as seen in Fig. 6, and the cord 42 passing downwardly from the intermediate portion of the bows around the respective pulley wheels 40 and 41. The ends of the cord 42 are connected by an elastic spring or portion 43, which renders the cord 42 taut when the top is erected. The pulley wheels serve as guides for the controlling cord 42, and it will be noted that certain runs of the cord 42 within the bows will travel in the same direction upwardly and downwardly when the cord is moved around the pulley wheels or guides. The respective curtain 32 is connected to the cord 42, the upper ends of the binding strips 35 of the said curtain being attached, as at 44, to those runs of the cord 42 which move upwardly and downwardly simultaneously. For this reason, when one edge portion of the curtain is moved upwardly, the cord 42 being moved, will pull the other edge portion of the curtain upwardly, and the same is true when one edge portion of the curtain is moved downwardly, since the other edge portion will also be moved downwardly therewith. The curtain is thus prevented from buckling or becoming distorted when it is moved upwardly and downwardly, it being noted that when the curtain is moved upwardly, it will enter the crown portions of the respective bows, to open the doorway or passageway of the vehicle. The curtains may be readily raised and lowered at either edge, and when the top is folded, they are raised into the crown of the top, to fold readily with the cover or canopy 5. When the top is erected, the crown portion $1^b$ of the front bow in alining with the sections $1^a$ will enable the front curtains to properly slide upwardly and downwardly along the front bow.

Each of the links 23 has a latch bolt 45 sliding therethrough, and each of the limbs of the rear bow 4 is provided with a socket 46 for receiving the inner end of the respective latch bolt 45, whereby when the latch bolts 45 are pressed inwardly into engagement with the bow 4, the bow 4 and links 23 will be locked together for holding the rear bow in erect or unfolded position. The latch bolts 45 are similarly engageable with the second bow 2 when the bows are folded, as seen in Fig. 2, in order that the latch bolts 45 will hold the parts in folded position.

Each latch bolt 45 has a longitudinal slot 47 provided with deep end portions or recesses 48 at its ends, and the respective link 23 is provided with a bore 50 extending radially from the latch bolt 45. A ball 49 is movable within the bore 50 to engage the recesses 48, and a coiled wire expansion spring 51 is disposed within the bore 50 between the ball 49 and the plug 52 threaded into the bore. The ball 49 is arranged to snap into the respective recesses 48 when the latch bolt 45 is projected and retracted, and the ball 49 works within the slot 47 during the projection or retraction of the latch bolt. By means of the spring pressed ball 49 and recesses and slot in the latch bolt, the latch bolt may be held in or out of engagement with the rear bow or second bow 2.

Having thus described the invention, what is claimed as new is:

1. In a vehicle top, a guide rail, a tubular member having its inner end slidably engaging the rail, a bow slidably upon said tubular member, and a spring pressed latch within said tubular member and engageable with the rail to hold the bow in place.

2. The combination with a vehicle body, a rear bow, links connecting the limbs of the rear bow and body whereby the rear bow may be moved downwardly with the links and whereby the rear bow may be moved upwardly with the links, bows adapted to be supported by the rear bow when the rear bow is swung downwardly, and means carried by said links for engaging the rear bow when the rear bow is raised and for engaging one of the other bows when said bows are supported upon the rear bow.

In testimony that I claim the foregoing as my own, I have hereto affixed my signature in the presence of two witnesses.

JAMES MINOR WORKMAN.

Witnesses:
J. M. RABB,
R. McHARDY MAULDIN.

Copies of this patent may be obtained for five cents each, by addressing the "Commissioner of Patents, Washington, D. C."